(No Model.)
C. A. BRACKLO.
FISH HOOK.
No. 595,691. Patented Dec. 21, 1897.
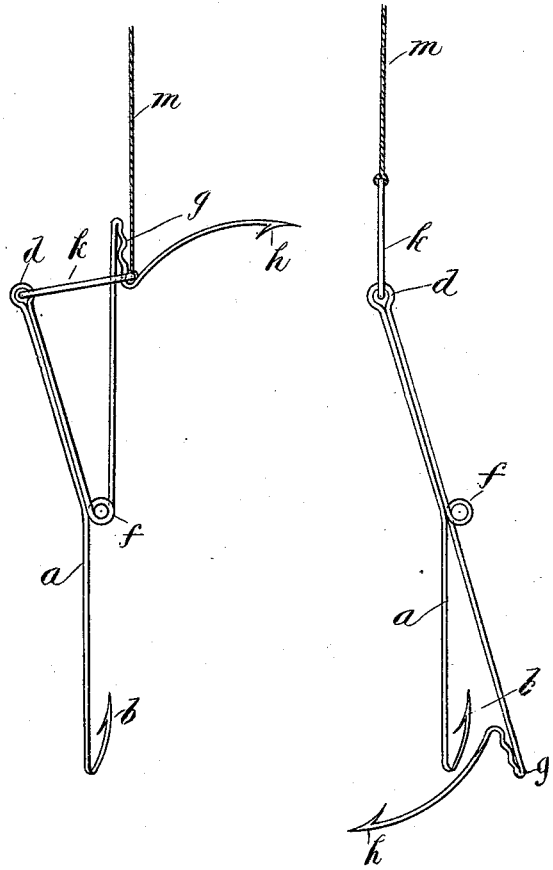
WITNESSES:
John Buckler
C. Gerst
INVENTOR
Charles A. Bracklo
BY
Edgar Tate
ATTORNEYS.

UNITED STATES PATENT OFFICE.

CHARLES A. BRACKLO, OF NEW YORK, N. Y.

FISH-HOOK.

SPECIFICATION forming part of Letters Patent No. 595,691, dated December 21, 1897.

Application filed August 21, 1897. Serial No. 649,060. (No model.)

*To all whom it may concern:*

Be it known that I, CHARLES A. BRACKLO, a subject of the Emperor of Germany, residing at New York, in the county of New York and State of New York, have invented certain new and useful Improvements in Fish-Hooks, of which the following is a full and complete specification, such as will enable those skilled in the art to which it appertains to make and use the same.

This invention relates to fish-hooks, and more particularly to that class thereof which are designed to prevent the escape of a fish that has once been hooked.

The object of my invention is to provide a hook of the above-described class which will prevent the escape of a fish when it has once taken the bait, which will be simple in construction, and which may be adjusted at the will of the user so as to respond to various degrees of strain occasioned by a fish taking the bait in attempting to escape. A further object is to provide a hook which will accomplish this end by an automatic movement.

My invention consists in the novel features of construction hereinafter set forth and described, and more particularly pointed out in the claim hereto appended.

Referring to the drawings, Figure 1 represents my improved hook when it is set preparatory to receiving the bait; and Fig. 2 is a view thereof, showing the position assumed when said hook has been put in operation.

In the accompanying drawings, $a$ represents the shank of an ordinary fish-hook, provided with a barb $b$, and extended upwardly to form a loop, as $d$. The free end of said shank is then formed into a spiral spring, as $f$, and extended for a distance approximately equal to that between the loop $d$ and spring $f$. At this point it is provided with a catch $g$, which is preferably made in the form of a ratchet, so that the tension on the spring $f$ may be increased, as hereinafter described. At the free end of the shank $a$ is supplied another barb $h$, which is designed so as not to come in contact with the barb $b$ when this section of the hook is released and interfere with the baited hook. The loop $d$ is provided with a link $k$, to which the fish-line $m$ is to be attached, said link being of a suitable length and construction to coöperate with the ratchet-latch $g$ in maintaining the hook in the position shown in Fig. 1.

The operation of my improved fish-hook is as follows: The hook $h$ having been brought in such a relation as will permit the link $k$ to engage with the latch $g$, the bait is attached to the barb $b$ and the line cast. Upon the fish taking the bait the tension on the line $m$ serves to release the barb $h$, which, by reason of the torsional strain occasioned by the spring $f$, descends rapidly and with sufficient force to embed itself in the bony portion of the fish's head. This prevents the fish from churning or swimming up on the line and striking it with its tail or disengaging the hook $b$ from its jaw and making its escape. The ratchet in the latch $g$ permits the said latch and the loop $d$ to be drawn together, increasing the tension on the spring $f$ at the same time, thus requiring a more severe strain on the line to release the barb $h$.

It is to be understood that there are many minor details of construction which are not herein described that come within the scope of my invention.

Having fully described my invention, what I claim, and desire to have protected by Letters Patent, is—

In a fish-hook, the combination of a main shank provided with a barb, an auxiliary spring-actuated barb, and a link connecting a loop in said main shank with a latch on said auxiliary barb, said latch being provided with a ratchet whereby the tension on said spring may be regulated, substantially as shown and described.

In testimony that I claim the foregoing as my invention I have signed my name, in presence of the subscribing witnesses, this 19th day of August, 1897.

CHARLES A. BRACKLO.

Witnesses:
C. GERST,
M. A. KNOWLES.